United States Patent [19]
Ravve et al.
[11] 3,903,322
[45] Sept. 2, 1975

[54] PHOTOPOLYMERIZABLE ETHYLENICALLY UNSATURATED COMPOUNDS PHOTOINITIATED WITH BENZOYL DERIVATIVES OF DIPHENYL SULFIDE AND AN ORGANIC AMINE COMPOUND

[75] Inventors: Abraham Ravve, Lincolnwood; Thor Jondahl, Chicago; George Pasternack, Chicago; Kenneth H. Brown, Chicago, all of Ill.

[73] Assignee: Continental Can Company, Inc., New York, N.Y.

[22] Filed: Mar. 7, 1974

[21] Appl. No.: 449,151

[52] U.S. Cl. ............ 427/54; 96/115 P; 204/159.18; 204/159.19; 204/159.24; 260/23 EP; 260/42.28; 260/836; 260/837 R; 427/385; 427/386; 427/388; 428/418; 428/461

[51] Int. Cl.$^2$..... C08F 2/46; C08F 8/18; B05C 5/00

[58] Field of Search..... 204/159.23, 159.24, 159.18; 96/115 P, 115 R; 117/93.31

[56] References Cited

UNITED STATES PATENTS

| | | | |
|---|---|---|---|
| 3,386,904 | 6/1968 | Petropoulos | 204/159.24 |
| 3,720,635 | 3/1973 | Metzner et al. | 204/159.24 |
| 3,759,807 | 9/1973 | Osborn et al. | 204/159.23 |
| 3,827,957 | 8/1974 | McGinniss | 204/159.24 |
| 3,840,448 | 10/1974 | Osborn et al. | 204/159.14 |

*Primary Examiner*—Richard B. Turer
*Attorney, Agent, or Firm*—Paul Shapiro; Joseph E. Kerwin; William A. Dittmann

[57] ABSTRACT

Photopolymerizable compositions useful as coatings and printing ink vehicles, the compositions being comprised of (1) an ethylenically unsaturated compound and (2) a photoinitiating combination of a benzoyl derivative of diphenyl sulfide and an organic amine compound.

20 Claims, No Drawings

PHOTOPOLYMERIZABLE ETHYLENICALLY UNSATURATED COMPOUNDS PHOTOINITIATED WITH BENZOYL DERIVATIVES OF DIPHENYL SULFIDE AND AN ORGANIC AMINE COMPOUND

BACKGROUND OF THE INVENTION

1. Field of the Invention

This invention relates to photopolymerizable compositions and more particularly to photoinitiated photopolymerizable compositions which are useful as coatings and printing ink vehicles.

2. The Prior Art

Coatings and printing ink vehicles prepared from ethylenically unsaturated compounds are known to the art which can be polymerized and dried by exposure to ultraviolet radiation as for example, U.S. Pat. Nos. 2,453,769, 2,453,770, 3,013,895, 3,051,591, 3,326, 710 and 3,511,710.

One important factor determining the commercial use of these photopolymerizable compositions as coating or printing ink vehicles is the speed at which the composition is cured to a hard, dry film. Generally, photoinitiators are incorporated in the composition to accelerate the speed at which the photopolymerizable composition cures to a hard film.

An important class of compounds known to the art to be useful as photoinitiators are sulfur containing aromatic carbonyl compounds. Most members of this class of compounds have limited utility for use in coating vehicles for high speed metal decoration as in coil coatings for metal containers, as either the photoinitiators do not sufficiently accelerate the polymerization of the photopolymerable coating vehicle or impart a distinct yellowing to the dried films which limits their utility. Thus, for example, a sulfur containing aromatic carbonyl compound such as chlorothioxanthone, when used in combination with an amine activating agent such as triethanolamine and incorporated in photopolymerizable coating compositions based on ethylenically unsaturated compounds as disclosed in U.S. Pat. No. 3,759,807 causes rapid drying of the coating composition but the hardened film also has a yellow tint which is undersirable in coil coating applications.

Photopolymerizable compositions photoinitiated with aromatic carbonyl compounds such as diethoxy acetophenone (U.S. Pat. No. 3,715,293) and 2-phenylthioacetophenone (U.S. Pat. No. 3,720,635) do not yellow on hardening, but unfortunately do not harden rapidly enough for use in coating applications wherein high speed drying is a mandatory requirement for use.

SUMMARY OF THE INVENTION

In accordance with the present invention there is provided compositions sensitive to rapid polymerization by exposure to a source of ultraviolet radiation, the compositions being comprised of a photopolymerizable ethylenically unsaturated compound and a photoinitiating amount of a benzoyl derivative of diphenyl sulfide and an organic amine compound.

Compositions prepared in accordance with this invention can be rapidly dried when exposed to ultraviolet light without appreciable yellowing of the dired film.

PREFERRED EMBODIMENTS

The term "ethylenically unsaturated compound" as used herein means olefinic organic compounds containing at least one terminal $CH_2$=C< group. Included within the meaning of ethylenically unsaturated compound are vinyl monomers, monohydric alcohol esters of $\alpha$, $\beta$ -ethylenically unsaturated acids, polyesters obtained by the reaction of an $\alpha$, $\beta$ -ethylenically unsaturated mono- or dibasic acid with a polyhydric alcohol having 2 to 6 hydroxyl groups or a polyepoxide containing at least 2 reactive epoxy groups in the polyepoxide molecule and mixtures thereof. Included within the meaning of $\alpha$, $\beta$ -ethylenically unsaturated acid are unsaturated monocarboxylic acids having from 3 to 6 carbon atoms, e.g., acrylic acid, methacrylic acid, crotonic acid and sorbic acid and unsaturated dicarboxylic acids having 4 to 10 carbon atoms, e.g., maleic acid, tetrahydrophthalic acid, furmaric acid, glutaconic acid, itaconic acid and the like.

Illustrative examples of ethylenically unsaturated compounds include alkenyl aromatic monomers such as styrene, methyl styrene, vinyl toluene, dichlorostyrene, acrylonitrile, methacrylonitrile, methyl acrylate, methyl methacrylate, ethyl acrylate, butyl acrylate, butyl methacrylate, octyl acrylate, 2-ethylhexylacrylate, vinyl chloride and the like. Ethylenically unsaturated polyesters are particularly preferred in the practice of the present invention. Illustrative of ethylenically unsaturated polyesters are acrylic acid and methacrylic acid esters of aliphatic polyhydric alcohols such as, for example, the di- and polyacrylates and the di- and polymethacrylates of ethylene glycol, polyalkylene glycols such as diethylene glycol, triethylene glycol, tetraethylene glycol, tetramethylene glycol, the corresponding ether glycols, triethylolethane, trimethylolpropane, pentaerythritol, dipentaerythritol and polypentaerythritols.

Typical unsaturated polyesters include, but are not limited to trimethylolpropane triacrylate, trimethylolethane triacrylate, triethylolpropane trimethacrylate, trimethylolethane trimethaacrylate, tetramethylene glycol dimethacrylate, ethylene glycol dimethacrylate, triethylene glycol dimethacrylate, tetraethylene glycol diacrylate, tetraethylene glycol dimethacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentaacrylate, dipentaerythritol hexaacrylate, pentaerythritol dimethacrylate, pentaerythritol trimethacrylate, and dipentaerythritol dimethacrylate.

A preferred class of ethylenically unsaturated polyester compounds useful in the practice of the present invention are the reaction products of a polyepoxide having at least two reactive groups in the polyepoxide molecule and an ethylenically unsaturated acid such as the $\alpha$, $\beta$ -ethylenically unsaturated monocarboxylic acids having 3 to 6 carbon atoms and $\alpha$, $\beta$ -ethylenically unsaturated dibasic acids having 4 to 10 carbon atoms previously discussed.

These polyepoxide derived polyesters are well known to the art, e.g., U.S. Pat. Nos. 3,637,618, 3,408,422, 3,373,075 and British Pat. No. 1,241,851 the teachings of which are incorporated herein by reference.

Typical examples of polyepoxide compounds used for the preparation of ethylenically unsaturated polyesters preferred in the practice of the present invention include epoxidized polybutadiene (Oxiron 2001), epoxidized linseed oil (Epoxol 9–5) 1,4-butylene diglycidyl ether (RD-2), vinylcyclohexene diepoxide (Epoxide 206) resorcinol diglycidyl ether (Kopoxite 159), Bisphenol A-diglycidyl ether (DER-332), s-tetraphenylethane tetra-glycidyl ether (Epon 1031), novolac resin polyglycidyl ether (DEN 438), dicyclopentadiene diepoxide (Epoxide 207) and dipentene dioxide.

Polyesters especially preferred in the practice of the present invention are polyesters prepared by reacting Bisphenol A-diglycidyl ether (i.e., the diglycidyl ether of 2,2-bis (4-hydroxyphenyl) propane) with an ethylenically unsaturated monocarboxylic acid such as acrylic or methacrylic acid at a molar ratio of about 1:2 to prepare the diacrylate reaction product or with an ethylenically unsaturated dicarboxylic acid such as itaconic acid at equal molar ratios.

The bisphenol-diglycidyl ether diacrylate may be blended with the bisphenol-diglycidyl ether itaconate as well as other ethylenically unsaturated compounds to prepare photopolymerizable mixtures having the physical properties suitable for printing ink and coating vehicles.

The benzoyl derivative of diphenylsulfide is prepared by reacting an acid salt of a benzoyl compound (e.g., benzoyl chloride) with diphenyl sulfide in the presence of a Friedel-Crafts catalyst (e.g., $AlCl_3$) and an inert, solvent (e.g., tetrachloroethylene) at ambient or slightly elevated temperatures (e.g., 35°–50°C) for 2–4 hours with removal of the acid reaction by-product. Benzoyl derivatives of diphenyl sulfide containing high concentrations of the monobenzoyl derivative of diphenyl sulfide are obtained by reacting equal molar amounts of the benzoyl acid salt and diphenyl sulfide. If the dibenzoyl derivative of diphenylsulfide is desired, the benzoyl acid salt and diphenyl sulfide are reacted at molar ratio of 2:1.

The benzoyl derivatives of diphenyl sulfide useful as photoinitiators in the practice of the present invention are represented by the formula

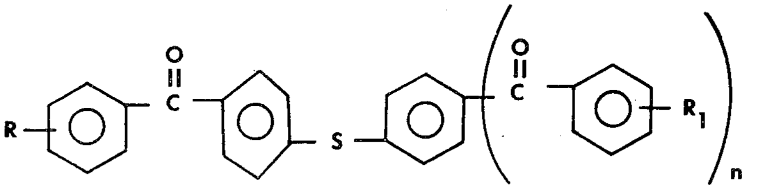

wherein each of R and $R_1$ is hydrogen, alkyl of 1 to 10 carbon atoms, halogen, alkoxy, aryl, alkaryl arylalkyl, nitro or cyano groups and *n* is zero or 1.

Illustrative of benzoyl derivatives of diphenyl sulfide which may be used in the practice of the present invention are benzoyl diphenyl sulfide, chlorobenzoyl diphenyl sulfide, dichlorobenzoyl diphenyl sulfide, toluoyl diphenyl sulfide, propylbenzoyl diphenyl sulfide, nonylbenzoyl diphenyl sulfide, methoxybenzoyl diphenyl sulfide, butoxybenzoyl diphenyl sulfide, benzylbenzoyl diphenyl sulfide, nitronbenzoyl diphenyl sulfide, cyanobenzoyl diphenyl sulfide and dibenzoyl diphenyl sulfide.

The benzoyl derivatives of diphenyl sulfide may be incorporated in the photopolymerizable compositions at concentrations ranging from about 0.1 to about 10% by weight, about 0.2 to about 5.0% by weight being particularly advantageous and about 0.5 to about 2.5% by weight being preferred.

The organic amine compounds function as activators for the photoinitiators in the photopolymerization reaction by which the ethylenically unsaturated compounds harden and enhance the photoinitiation of these compounds by the benzoyl derivatives of diphenyl sulfide. Organic amine compounds which may be used in combination with the benzoyl derivatives of diphenyl sulfide in the practice of the present invention are organic amine compounds having at least one alpha

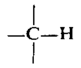

group attached to the amino nitrogen and include primary, secondary and teritary, aliphatic, heterocylic and aromatic amines such as methyl amine, dimethylamine, trimethylamine, ethylamine, dimethylethylamine, diethylamine, triethylamine, n-propyl amines, isopropylamine, n-butylamine, isobutylamine, n-hexylamine,octyl amine, piperidine, N-methyl piperidine, aniline, benzyl dimethylamine, diamines and polyamines such as ethylene diamine and triethylenetetramine. A more complete listing of organic amine activators useful in the practice of the present invention are disclosed in U.S. Pat. Nos. 3,026,203, 3,418,118, 3,558,387 and 3,759,807. Amines which are particularly advantageously employed in the practice of the present invention are hydroxyalkyl amines such as ethanol amine, diethanol amine, triethanol amine, propanol amine, butanol amine, octanol amine, 2-aminocyclohexanol, N-methylethanol amine, N-methyldiethanol amine, 2-piperidenol, 3-amino-1, 2-propanediol, 1-amine-2, 3-butanediol, 1-amino-3-dimethylamino-2-propanol, 4-(3-amine-propyl) morpholine, N-hydroxyethyl piperidine, alkoxyalkylamines such as 2-methoxyethylamine, 3-methoxypropylamine, 3-isopropyoxypropy-amine, N-(2-methoxyethyl) ethylene diamine, 1-amino-3-methoxy-2-propanol, 1-amino-3-butoxy-2-propanol, 1-amino-3-pentoxy-2-propanol and 2-(2-methoxyethyoxy) ethyl amine. Alkanol amines are preferred in the practice of the present invention.

The organic amine compounds are incorporated in the ethylenically unsaturated photopolymerizable compositions of the present invention at a concentration of about 0.1 to about 10% by weight, although about 0.1 to about 5 percent by weight of the amine provides advantageous results. When the preferred concentration range of benzoyl derivative of diphenyl sulfide is incorporated in the photopolymerizable composition, i.e., about 0.5 to about 2.5% by weight, the concentration of amine compound incorporated in the composition will generally range from about 0.8 to about 4.0 percent by weight.

The compositions of the present invention are particularly useful as photopolymerizable coatings and printing ink vehicles. In general, printing inks prepared using the photoinitiated compositions of the present invention are prepared in the same manner as conventional printing inks. Generally, the printing inks contain about 30 to about 95 percent by weight of the photoinitiated compositions and about 5 to 70 percent by weight of a colorant or pigment such as $TiO_2$ or a dye such as phthalocyanine blue or carbon black.

In printing metal surfaces with ultraviolet curable printing inks, the ink is applied using a printing press conventionally used for printing on a metal substrate. Once the metal substrate, generally in the form of a sheet is printed, the substrate is positioned to pass under a source of ultraviolet light to dry and harden the ink. In most instances, the ultraviolet light source is maintained at about 0.5 to about 5 inches from the printed substrate undergoing irradiation.

Rapid drying of the inks using the photoinitiated compositions of the present invention is effected within seconds of exposure to ultraviolet light emitted from an artificial source having a wave length in the range between 4000A and 1800A.

In the printing of metal coil stock for beverage container manufacture where extremely high speed drying of the ink (i.e., within 0.1 to 0.25 second) is required, mercury vapor discharge lamps, especially of the medium pressure type are used as a source of ultraviolet radiation. The output of commercially available medium pressure mercury vapor lamps varies between 100 watts per linear inch to 200 watts per linear inch of lamp surface.

Low pressure mercury vapor discharge lamps, which are lower in cost than medium pressure lamps and do not require extended warm-up periods may be used in coating or printing operations where the extremely rapid curing speeds of metal coil decorating are not required, e.g., in the textile, paper and plastic coating industry. Low pressure mercury vapor discharge lamps have an output ranging from about 1 to 3 watts/linear inch.

The present invention is illustrated by the Examples which follow.

EXAMPLE I

A clear coating material composed of a photopolymerizable mixture of ethylenically unsaturated ester compositions was prepared and consisted of 272 parts of the diacrylate reaction product of bisphenol A-diglycidyl ether and acrylic acid, 190 parts pentaerythritol tetracrylate, 28.7 parts of an unsaturated polyester prepared by reacting equal molar amounts of itaconic acid and bisphenol A-diglycidyl ether and 15.3 parts of tetraethylene glycol diacrylate.

A series of photopolymerizable coating compositions were prepared wherein $4.05 \times 10^{-4}$ mole of a benzoyl derivative of diphenyl sulfide and 2.56% by weight triethanol amine were added to the ester mixture. These compounds and their concentrations in the ester mixture are listed in Table I below.

The benzoyl derivatives of diphenyl ether were prepared by following the procedure for the preparation of benzoyl diphenyl sulfide which is described immediately below:

Into a 1-liter round bottom three-necked flask equipped with a reflux condenser, mechanical stirrer, thermometer and a dropping funnel were placed a reaction mixture of 0.5 mole (93 g.) diphenyl sulfide, 0.5 mole aluminum chloride (61.6 g), and 200 ml tetrachloroethylene. The reaction mixture was stirred and cooled to 10°C. One-half mole of benzoyl chloride dissolved in 100 ml of tetrachloroethylene was added dropwise to the reaction mixture over a one hour period. After all the chloride salt had been added, the reaction mixture was stirred at room temperature, heated to 40°C to evolve HCl, and then stirred for an additional 2 hours. The reaction mixture was cooled and poured from the flask onto ice. The tetrachloroethylene solution was then sequentially washed with the dilute HCl solution, dilute $Na_2CO_3$ solution and water. The tetrachloroethylene was removed and the solid product obtained was purified by recrystallization.

For purposes of contrast, a series of coating compositions were prepared wherein $4.05 \times 10^{-4}$ mole or more of a variety of aromatic carbonyl compounds outside the scope of the present invention were substituted for the benzoyl derivatives of diphenyl sulfide in the photopolymerizable ester mixture of Example I.

These aromatic carbonyl compounds and their concentrations in the ester mixture are also listed in Table I and designated by the symbol C.

All of the benzoyl derivatives of diphenyl sulfide used in the Example I as well as the aromatic carbonyl compounds used in the comparative examples were purified by being chromatographed on a column of silica gel prior to use. Chlorothioxanthone was first chromatographed and then recrystallized to insure the purity of this compound.

The photopolymerizable compositions containing the photoinitiating compounds were then applied to steel plate of the type used in the manufacture of steel beverage containers using a number 10 draw bar which evenly distributed the compositions as a thin film on the plate.

After application of the photopolymerizable compositions, the coated plates were placed under two low pressure mercury lamps at a distance of about 2.75 inches from the lamp surface.

The radiation emitted by the lamps was approximately 3 watts/in. of lamp surface. The coated plates were exposed to the ultraviolet radiation for 4 to 8 seconds to effect drying.

The dryness of the irradiated coating was evaluated by rubbing the coating with one's fingers.

The irradiated coatings received the following ratings:

Cured: Hard finger rubbing of coating surface does not rupture coating film.

Tack: Dry surface, but some rupture of coating film when rubbed with fingers, Sl. Tack = slightly tacky, V.Sl. Tack = very slightly tacky.

Wet: Coating film has same physical state as existed prior to irradiation.

The results of the coating runs are recorded in Table I below.

In a comparative series of runs, the coating procedure was repeated with the exception that the coating formulations designated by the symbol C in Table I were used. The results of the comparative coating runs are also recorded in Table I.

TABLE I

| Composition No. | Photoinitiator | Concentration % by Weight | Evaluation of Coating After Exposure to U.V. Radiation Exposure Time (Sec.) 4 | 6 | 8 |
|---|---|---|---|---|---|
| 1. | Benzoyl diphenyl sulfide | 1.14 | V.Sl.Tack | V.Sl.Tack | Cured |
| 2. | Benzoyl diphenyl sulfide | 1.80* | V.Sl.Tack | Cured | |
| 3. | Dibenzoyl diphenyl sulfide | 1.53 | V.Sl.Tack | Cured | — |
| 4. | Di-o-toluoyl diphenyl sulfide | 1.62 | Cured | — | — |
| 5. | Di-m-chlorobenzoyl diphenyl sulfide | 1.80 | Sl.Tack | Sl.Tack | Sl.Tack |
| 6. | Di-o-chlorobenzoyl diphenyl sulfide | 1.80 | Sl.Tack | V.Sl.Tack | V.Sl.Tack |
| $C_1$ | Dibenzoyl diphenyl ether | 1.46 | Wet | Wet | Wet |
| $C_2$ | Dibenzoyl diphenyl ether | 1.80* | Wet | Tack | Tack |
| $C_3$ | Thiophenyl acetophenone | 0.89 | Wet | Wet | Wet |
| $C_4$ | Thiophenyl acetophenone | 1.80* | Wet | Wet | Wet |
| $C_5$ | 2,2-Diethoxyacetophenone | 0.81 | Sl.Tack | Sl.Tack | Sl.Tack |
| $C_6$ | 2,2-Diethoxyacetophenone | 1.80* | Sl.Tack | V.Sl.Tack | V.Sl.Tack |
| $C_7$ | 2-Chlorothioxanthone | 0.96 | Sl.Tack | V.Sl.Tack | Cured |
| $C_8$ | 2-Chlorothioxanthone | 1.80* | V.Sl.Tack | Cured | — |

*Concentration is greater than $4.05 \times 10^{-1}$ mole.

The data in Table I indicate that ethylenically unsaturated polyester compositions photoinitiated in accordance with the practice of the present invention in most instances are photopolymerized to a dry state more quickly than the same ethylenically unsaturated polyester compositions photoinitiated with aromatic sulfur containing ketone-compounds outside the scope of the invention when exposed to the same ultraviolet source, (compositions no. $C_1$—$C_6$), chlorothioxanthone being the only exception.

EXAMPLE II

A white ink was prepared on a three roll mill using 50% of titanium dioxide pigment and 50% of the ink vehicle used in Example I.

Included in the ink was 1.80% by weight of a photoinitiator and 2.56% by weight of triethanolamine.

The inks were applied to steel plates following the procedure of example I. After application of the ink, the plates were placed under a medium pressure mercury vapor lamp and exposed for 0.1–0.5 seconds to effect drying. The results of these runs are recorded in Table II below.

TABLE II

| Photoinitiator | Exposure Time (Sec) 0.1 | 0.3 | 0.5 |
|---|---|---|---|
| Benzoyldiphenyl sulfide | Cured | — | — |
| 2-Chlorothioxanthone | Cured | — | — |
| 2,2-Diethoxyacetophenone | Coating rubs off with finger | Coating rubs off with finger | Cured |

EXAMPLE III

The discoloration of hardened films of photopolymerized compositions of the present invention was determined by applying clear films of the photoinitiated compositions used in Example I to the surface of clear glass slides with a fine wire-wound drawdown bar. The films were then hardened with ultraviolet light in accordance with the procedure of Example I.

The discoloration of the hardened, irradiated films was measured with an IDL "Color Eye" Colorimeter Spectrophotometer. $BaSO_4$ and a blank slide were used for standardization. The data obtained was used to calculate the yellowness Index (YI) in accordance with ASTM D10975-62. A YI number of zero means neutral. Positive numbers denote increasing yellowness. The YI of irradiated films of photopolymerizable compositions used in Example I is recorded in Table III below.

TABLE III

| Composition No. | Photoinitiator* | Concentration % by Weight | YI |
|---|---|---|---|
| 1 | Benzoyl diphenyl sulfide | 1.14 | 1.27 |
| 3 | Di-o-tolyloyl diphenyl sulfide | 1.62 | 1.11 |
| $C_7$ | 2-Chlorothioxanthone | 0.96 | 4.55 |

*2.56% by weight triethanol amine included

The results recorded in Table III indicate that compositions photoinitiated in accordance with the present invention (compositions 1 and 3) when exposed to U.V. radiation undergo relatively little discoloration when compared to aromatic sulfide photoinitiated compositions (i.e., chlorothioxanthone, composition $C_3$) outside the scope of the present invention.

What is claimed is:

1. A photoinitiated composition comprised of an ethylenically unsaturated compound and a photoinitiating amount of a benzoyl derivative of diphenyl sulfide and an organic amine compound having at least one alpha —C—H group attached to the amino nitrogen, the benzoyl derivative of diphenyl sulfide having the formula

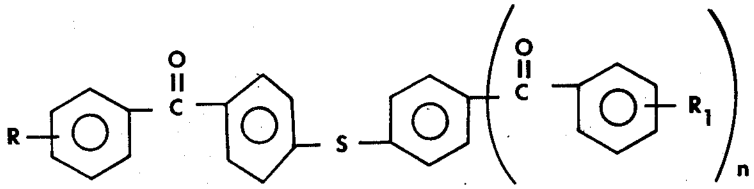

where each of R, $R_1$ represents a radical selected from the group consisting of hydrogen, alkyl of 1 to 10 carbon atoms, halogen, alkoxy, aryl, alkaryl, arylalkyl, cyano and nitro groups and *n* is zero or 1.

2. The composition of claim 1 wherein the benzoyl derivative of diphenyl sulfide is benzoyl diphenyl sulfide.

3. The composition of claim 1 wherein the benzoyl derivative of diphenyl sulfide is dibenzoyl diphenyl sulfide.

4. The composition of claim 1 wherein the benzoyl derivative of diphenyl sulfide is di-o-toluoyldiphenyl sulfide.

5. The composition of claim 1 wherein the benzoyl derivative of diphenyl sulfide is di-m-chlorobenzoyl diphenyl sulfide.

6. The composition of claim 1 wherein the benzoyl derivative of diphenyl sulfide is di-o-chlorobnzoyl diphenyl sulfide.

7. The composition of claim 1 wherein the amine compound is an alkanol amine.

8. The composition of claim 1 wherein the amine compound is triethanol amine.

9. The composition of claim 1 wherein the ethylenically unsaturated compound is an ethylenically unsaturated ester.

10. The composition of claim 9 wherein the ethylenically unsaturated ester is the reaction product of a polyepoxide having at least two reactive groups in the polyepoxide molecule and an acid selected from the group consisting of $\alpha$, $\beta$ -ethylenically unsaturated monocarboxylic acids having 3 to 6 carbon atoms and $\alpha$, $\beta$ -ethylenically unsaturated dibasic acids having 4 to 10 carbon atoms.

11. The composition of claim 9 wherein the unsaturated compound is the reaction product of a polyhydric alcohol having 2 to 6 carbon atoms and an acid selected from the group consisting of $\alpha$, $\beta$ -ethylenically unsaturated monocarboxylic acids having 3 to 6 carbon atoms and $\alpha$, $\beta$ -ethylenically unsaturated dibasic acids having 4 to 10 carbon atoms.

12. The composition of claim 10 wherein the polyepoxide is the diglycidyl ether of bisphenol A.

13. The composition of claim 10 wherein the acid is acrylic acid.

14. The composition of claim 10 wherein the acid is itaconic acid.

15. The composition of claim 9 wherein the alcohol is pentaerythritol.

16. The composition of claim 9 wherein the alcohol is polyethylene glycol.

17. The composition of claim 1 wherein the benzoyl derivative of diphenyl sulfide compound is incorporated in the polyester at a concentration at about 0.1 to about 10 percent by weight.

18. The composition of claim 1 wherein the organic amine compound is incorporated in the polyester at a concentration of about 0.1 to about 10 percent by weight.

19. A method of coating a substrate which comprises the steps of applying to the substrate a thin film of the composition of claim 1, exposing the thin film to a source of ultraviolet radiation until the composition becomes dry.

20. A coating material comprised of the composition of claim 1.

* * * * *